Figure 1:
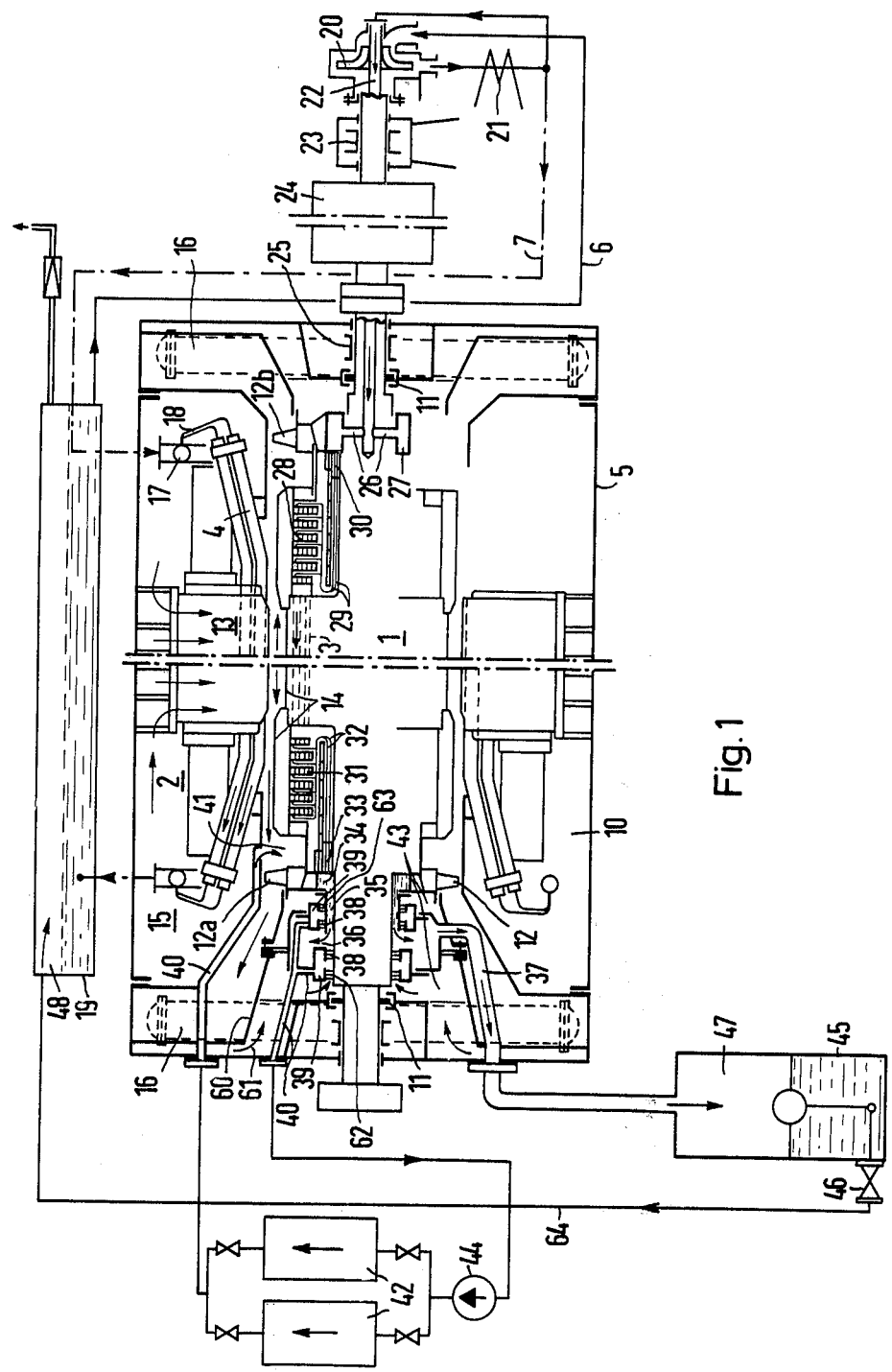

United States Patent [19]

Lambrecht et al.

[11] 3,968,388

[45] July 6, 1976

[54] ELECTRIC MACHINES, PARTICULARLY TURBOGENERATORS, HAVING LIQUID COOLED ROTORS

[75] Inventors: Dietrich Lambrecht; Erich Weghaupt, both of Mulheim, Germany

[73] Assignee: Kraftwerk Union Aktiengesellschaft, Mulheim (Ruhr), Germany

[22] Filed: Jan. 8, 1975

[21] Appl. No.: 539,421

Related U.S. Application Data

[63] Continuation of Ser. No. 366,769, June 4, 1973, abandoned.

[30] Foreign Application Priority Data

June 14, 1972 Germany............................ 2228993

[52] U.S. Cl.................................. 310/53; 310/54; 310/58
[51] Int. Cl.² ........................................ H02K 9/00
[58] Field of Search .................. 310/52, 53, 54, 55, 310/56, 58, 61, 62, 64, 65, 113; 165/47, 80

[56] References Cited
UNITED STATES PATENTS

| | | | |
|---|---|---|---|
| 2,527,878 | 10/1950 | Fechheimer | 310/54 |
| 2,917,644 | 12/1959 | Laffoon | 310/55 |
| 3,089,969 | 5/1963 | Wiedeman | 310/53 |
| 3,348,081 | 10/1967 | Willyoung | 310/55 |
| 3,497,737 | 2/1970 | Philofsky | 310/54 |
| 3,733,501 | 5/1973 | Heller | 310/54 |
| 3,733,502 | 5/1973 | Curtis | 310/61 |
| 3,753,013 | 8/1973 | Beermann | 310/54 |
| 3,755,702 | 8/1973 | Willyoung | 310/53 |

*Primary Examiner*—R. Skudy
*Attorney, Agent, or Firm*—Herbert L. Lerner

[57] ABSTRACT

In liquid cooled rotors of turbogenerators with half-turn cooling and cooling water feed at the dynamo side as well as cooling water discharge through a collecting chamber on the turbine side, the cooling water collecting chamber is arranged within the generator housing, axially immediately adjacent to the receiving chamber, and is sealed against the rotor shaft by labyrinth rings through which is provided, as a barrier, a flow of the cooling gas for the generator housing.

8 Claims, 2 Drawing Figures

ELECTRIC MACHINES, PARTICULARLY TURBOGENERATORS, HAVING LIQUID COOLED ROTORS

This is a continuation of application Ser. No. 366,769, filed June 4, 1973, now abandoned.

This invention relates to a liquid-cooled rotor for electric machines, and in particular, turbogenerators, with directly cooled armature windings of the generator rotor.

In the cooling of the armature windings of turbogenerators it is known to feed the cooling water at the dynamo side of the rotor and to let it flow out again there (U.S. Pat. No. 3,497,736). Such a cooling water path is mainly suited for the cooling of full turns of the armature windings as the feeding and the discharge of the water take place at the same end of the windings. The dynamo in this connection and hereafter in this application is a small direct current dynamo for producing the magnetic field in accordance with conventional practice.

For optimum utilization of water cooling, however, it is advisable to employ so-called half-turn cooling, i.e., the cooling water flows through only each half-turn of the armature windings. Because of the short cooling path, an optimum cooling effect is obtained with this arrangement. With such half-turn cooling, the cooling water is fed in at the end of the windings on the dynamo side and discharged at the end of the windings on the turbine side. The water leaving the coil end on the turbine side can be returned to the dynamo side either through a concentric hole in the rotor body or by means of pipes installed along the pole surfaces and is removed from the rotor at the shaft end on the dynamo side (German Auslegeschrift No. 1,538,938). Such ducting of the cooling water, however, requires very expensive manufacturing and causes a high pressure drop of the cooling water in the rotor.

It is, however, also known to discharge the warm cooling water from the rotor at the shaft end on the turbine side (U.S. Pat. No. 2,527, 878). In this case, a cooling water collecting chamber is arranged surrounding the shaft between the generator and the turbine. The cooling water, which emerges from radial holes in the shaft at high speed, is collected in this collecting chamber and is led off. Although in such an arrangement of a collecting chamber, it is no longer necessary to return the warm cooling water to the dynamo side, considerable disadvantages are encountered. Thus, for discharging the cooling water in the shaft end on the turbine side, axial and radial holes are required, which weaken the shaft end on the drive side excessively. It is, moreover, necessary to operate the cooling water circuit under exclusion of air, in order to avoid corrosion of the conductors in the excitation winding by the oxygen in the air. In order to fulful this requirement, the collecting chamber must have a sealing arrangement of very high quality constituted of two shaft seals, which ensure a perfect seal against the atmosphere. Under the sealing conditions prevailing at the shaft end on the turbine side, such as a large shaft diameter, high circumferential velocity and large axial shaft expansion, however, operationally reliable shaft seals can be made only with very great technical effort.

It is, therefore, an object of the invention to provide an electric machine with cooling water feed to the individual conductors from a distribution chamber on the shaft on the dynamo side and cooling water discharge through a receiving chamber into an annular cooling water collecting chamber which surrounds the shaft on the turbine side, in which the cooling water collecting chamber is designed and arranged in such a manner that, on the one hand, technically very simple but reliable seals suffice and, on the other hand, air penetration is practically impossible.

According to the invention, the cooling water collecting chamber is arranged within the generator housing axially immediately adjacent to the receiving chamber and is sealed against the rotor shaft by labyrinth rings in which is provided, as a barrier, a flow of the cooling gas for the generator housing. The receiving chamber and the collecting chamber are connected here with each other via an axial canal and are arranged at the same axial location relative to the rotor shaft. The labyrinth rings on both sides of the cooling water collecting chamber each have a cooling water return canal and a cooling gas exhaust chamber. The exhaust chamber is connected to a suction line which in turn is in connection to the suction side of the generator blower.

Through the arrangement of the cooling water collecting chamber within the generator housing, which in general contains hydrogen as a cooling medium, a perfect seal of the water circulation system against the atmosphere is provided by relatively simple means. By connecting the cooling gas exhaust chambers in the labyrinth rings to the suction side of the generator blower, a flow of gas is continuously generated between the labyrinth rings and the rotor shaft, acting as a barrier, whereby leakage of cooling water is reliably prevented.

Figure 2:
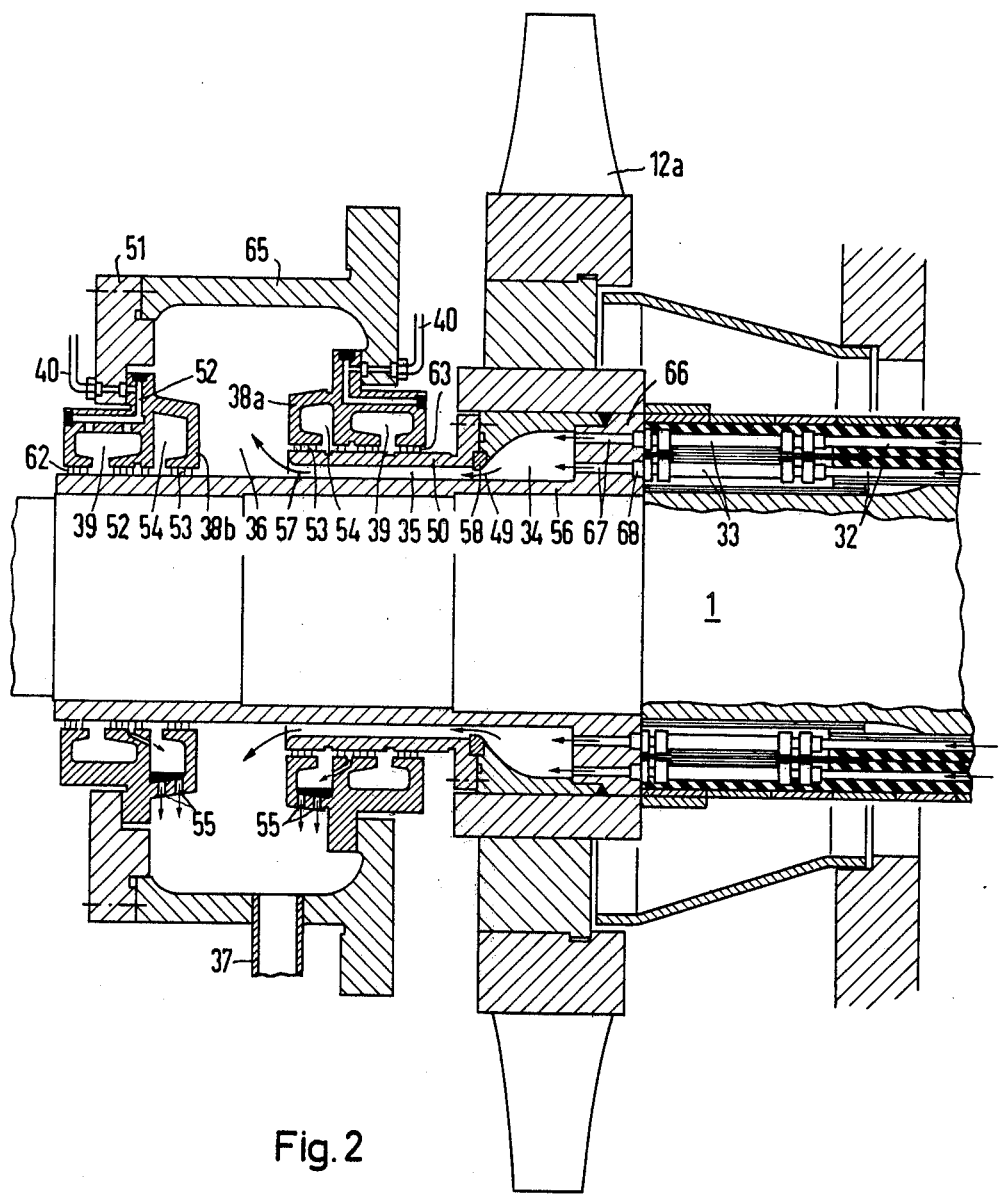

The according invention will be explained more fully by reference to a specific embodiment, as illustrated in the drawings. in which:

FIG. 1 is a schematic longitudinal cross section through a turbogenerator with the entire cooling water circulation system; and FIG. 2 is a schematic partial longitudinal cross section of the region of the cooling water discharge on the turbine side of the generator shaft.

The generator schematically shown in FIG. 1, comprising the rotor 1 and the armature windings 3 as well as the stator 2 and the stator windings 4, is arranged in a housing 5 of pressure and gas-tight design, the interior 10 of which is filled with hydrogen as the cooling gas at a predetermined pressure. The sealing of the rotor shaft 1 against the housing 5 is accomplished by means of conventional $H_2$ shaft seals. The hydrogen gas in the housing 5 is circulated by means of two blowers 12a and 12b in a closed circuit, cools the laminated stator construction 13, the surface 14 of the rotor and the rotor cap and removes the additional heat given off in the windings end spaces 15. The stator winding 4 is cooled in the conventional manner with water. The cooling water is fed to the stator winding through a distributor ring line 17 and insulated hose 18 on the dynamo side of the machine. The discharge of the water takes place in the same manner on the turbine side after passage of the water through the stator poles. For re-cooling the hydrogen cooling gas, hydrogen heat exchanges 16 are provided at both ends of the housing.

The cooling water itself is supplied from a water tank 19 arranged above the generator housing 5, through a line 6 to a shaft pump 20 arranged on the shaft end at the dynamo side. The water leaving the pump 20 flows first through a cooler 21 and is subsequently fed through a line 7 to the distributor ring line 27 for the stator windings 4, and through an axial bore 22 in the shaft to the rotor 1. The cooling water enters the axial shaft bore 22 at the shaft end on the dynamo side, flows through the bearing 23 of the dynamo 24, further through the entire dynamo 24 and the generator bearing 25 and finally through the radial canals 26 in the rotor shaft 1 into the cooling water distribution chamber 27 on the dynamo side. From here, the cooling water is brought through insulated hose 30 and the pipes 29 to each turn of the windings 3 at the end 28 thereof on the dynamo side. After flowing through the respective half-turns of the armature windings 3 in many parallel branches, the warm cooling water flows into the end 31 of the windings 3 on the turbine side and is conducted from there through the pipes 32 and the insulated high pressure hoses 33 into the receiving chamber 34 on the surface of the shaft. Through a ring canal 35, which is likewise arranged on the shaft surface, the cooling water then flows into the stationary cooling water collecting chamber 36, which, in accordance with the invention, is arranged within the generator housing 5 and surrounds the generator shaft in annular fashion. The collecting chamber 36 in situated on the pressure side of the hydrogen cooling gas circuit, as will be seen from the drawing. The hydrogen gas is led from the blower 12a first radially outside the baffles 60 through the gas cooler 16 and then flows from there in part radially inward, as indicated by the arrow 61, in the direction toward the cooling water collecting chamber 36. The collecting chamber 36 is sealed on both sides by labyrinth rings 38. Each of the labyrinth rings 38 has a gas exhaust chamber 39, each of which is connected to the suction side 41 of the blower 12a on the turbine side through pipelines 40. Through this relation of the collecting chamber 36 and the exhaust chambers 39 to the generator blower 12a, a sealing of the collecting chamber 36 against the interior of the generator is effected according to the invention. Through the outer portion of each of the labyrinth rings 62 and 63 facing the generator interior, a relatively large quantity of hydrogen gas flows into the labyrinth ring exhaust chambers 39. Through the pipeline 40 the gas is returned to the suction side of the blower 12a and into the hydrogen cooling circuit. In this manner, utilizing the blower pressure, a very effective hydrogen barrier flow is produced in the outer portion of the labyrinth rings, which prevents the emergence of water spray and water mist from the collecting chamber 36 into the generator space 43 in the vicinity of the collecting chamber.

In this connection, it is advisable to insert into the suction line 40, which extends out of the generator housing 5, a gas drier 42 and, optionally, also an additional suction blower 44.

Through a gravity pipe 37 connected to the collecting chamber 36, the cooling water gets to a collecting tank 45 arranged on a lower level, the level in which is controlled by a float valve 46. The collecting tank 45 is connected to the cooling water supply tank 19 through a return line 64. The gas space 47 of the collecting tank 45 is occupied by hydrogen gas at the pressure inside the housing 5. As the hydrogen pressure in the gas space 48 of the main water tank 19 is, however, 1 to 2 kg./cm². lower than the hydrogen pressure in the generator housing 5, the warm cooling water is returned automatically into the water tank 19.

In FIG. 2 which illustrates the region of the shaft at which the receiving chamber 34 is located, the ring canal 35, the collecting chamber 36 and the labyrinth rings 38 are shown on an enlarged scale. The cooling water travels through water pipes 32 which are installed in slots of the rotor shaft situated under the end 31 of the windings 3 and the ends of which are threadedly connected to the insulated hoses 33, into the cooling water receiving chamber 34, which annularly surrounds the rotor shaft. The chamber 34 is narrowed down at the outflow end to an annular gap 49 and which communicates with the connecting annular canal 35. The canal 35 is formed by a flanged tube 50 connected to the receiving chamber 34 by means of the flange. The canal 35 opens directly into the collecting chamber 36. The collecting chamber 36 is formed by a ring-shaped outer housing 65. At the end face of the housing 65 nearer the receiving chamber the labyrinth ring 38a is connected by means of a flange formed on the labyrinth ring 38a and at the other end face of the housing 65 the labyrinth ring 38b is connected by means of a flange formed on the labyrinth ring 38b and a flanged cover 51 which is provided to facilitate installation. Each labyrinth ring 38a, 38b comprises a gas exhaust chamber 39 open toward the surface of the shaft in the outer part of the labyrinth ring and a cooling water return canal 54 in the part of the labyrinth ring adjacent to the collecting chamber 36. The gas is drawn from the exhaust chambers 39 through holes 52 in the labyrinth ring body, to which the suction pipes 40 are connected. Due to the gas suction, the gas pressure in the collecting chamber 36 adjusts itself to a level which corresponds approximately to the suction pressure of the generator blower at the point 41 in FIG. 1. Thereby is established, through the outer ridges 62 and 63, at all times a gas flow from the interior 1 of the housing to the gas exhaust chambers 39, acting as a barrier so that cooling water is prevented from leaking out. The water flowing out of the collecting chamber 36 through the inner ridges 53 is led to the return channels 54, from which it is returned through holes 55 in the lower part of the labyrinth rings to the collecting chamber 36. To protect the shaft, a protective sleeve 56 is shrink fit on the shaft in the vicinity of the receiving chamber 34, the connecting canal 35, the collecting chamber 36 and the outer labyrinth ring 38b. The protective sleeve 36 forms on two sides the boundary of the receiving chamber 34 by means of a radial extension 65 provided at its inner end. The feed holes 67 for the cooling water are through the radial extension 66 drilled and the insulated hoses 33 are threadedly connected to the holes 67 by means of suitable fittings 68.

Because the water outlet 57 from the connecting canal 35 is radially positioned on a larger radius than the concentric water inlet 22 on the dynamo side, a very large internal pumping effect of several kg./cm². results from the centrifugal force of the water when the rotor revolves.

In addition, a replaceable choke ring 58, particularly matched to the rotor, can be built in at the annular gap 49, in order to avoid cavitation and gas penetration into the receiving chamber 34.

With the above described arrangement and design of the collecting chamber for the warm cooling water within the generator housing containing hydrogen as the cooling gas, and utilizing the suction force of the blower to provide a flow of the hydrogen at the shaft seals of the collecting chamber, the hydrogen flow acting as a barrier, it is assured by simple means that no oxygen penetration into the cooling water can take place, i.e., that the cooling water circulation is completely sealed from the ambient atmosphere. Furthermore, optimum cooling of the armature windings and discharge of the cooling water without the presence of cooling water discharge canals which weaken the shaft are provided.

We claim:

1. In an electrical machine having a housing, a shaft extending through the housing, a rotor mounted on the shaft within the housing, electrical conductors disposed within the housing, electric generating means mounted on the shaft externally to and to one side of the housing, and a coolant water distribution chamber located on the shaft at the one side of the housing, a coolant water receiving chamber surrounding the rotor, means for conducting coolant water in heat transfer relationship with the electrical conductors in the housing from the coolant water distribution chamber to the coolant water receiving chamber, axially extending channel means at the surface of the shaft connecting said coolant water receiving chamber to a collecting chamber located adjacent thereto, contact-free sealing means comprising labyrinth sealing rings sealing said collecting chamber from surrounding space within said housing, means for supplying hydrogen as cooling gas to the housing, and blower means for moving a flow of said hydrogen cooling gas as a barrier gas into said labyrinth sealing rings so as to block contamination of the coolant water in said collecting chamber by ambient oxygen in said surrounding space within the housing, both said collecting chamber and said labyrinth sealing rings being disposed within the housing.

2. Electrical machine according to claim 1 wherein said axially extending channel means comprises a tube coaxially surrounding the shaft and having an inner diameter larger than the diameter of the shaft so as to form an annular passage at the surface of the shaft, said tube being formed with a flange for connecting said tube to said coolant receiving chamber.

3. Electrical machine according to claim 1 including a hydrogen cooling gas circuit wherein said flow of hydrogen cooling gas is moved into said labyrinth sealing rings, said coolant water collecting chamber being located on the pressure side of said hydrogen cooling gas circuit, and including suction conduit means communicating with the suction side of said hydrogen cooling gas circuit, said blower means being connected to said suction conduit means.

4. Electrical machine according to claim 1 wherein each of said labyrinth sealing rings comprises a channel for returning coolant water to said coolant water collecting chamber and a chamber for exhausting said hydrogen cooling gas.

5. Electrical machine according to claim 4 including suction conduit means connecting each of the exhaust chambers of said labyrinth sealing rings with the suction side of said hydrogen cooling gas circuit.

6. Electrical machine according to claim 1 including a choke ring located in said axially extending channel means.

7. Electrical machine according to claim 1 including a protective sleeve tightly fitted on the shaft in the vicinity of said coolant water receiving and collecting chambers, said axially extending channel means and one of said labyrinth sealing rings remote from said electric generating means.

8. Electrical machine according to claim 1 wherein said protective sleeve has a radial extension forming a radial wall of said coolant water receiving chamber, said radial extension being formed with holes for feeding coolant water therethrough into said coolant water receiving chamber, and including coolant water lines connected to said feed holes for conducting coolant water thereto.

* * * * *